United States Patent
Seegopaul et al.

(10) Patent No.: US 6,852,303 B2
(45) Date of Patent: Feb. 8, 2005

(54) METHOD OF USING MOLYBDENUM CARBIDE CATALYST

(75) Inventors: Purnesh Seegopaul, Flemington, NJ (US); Lin Gao, Piscataway, NJ (US)

(73) Assignee: N.V. Union Miniere S.A. et al., Brussels (BE)

(*) Notice: Subject to any disclaimer, the term of this patent is extended or adjusted under 35 U.S.C. 154(b) by 0 days.

(21) Appl. No.: 10/675,078

(22) Filed: Sep. 30, 2003

(65) Prior Publication Data

US 2004/0062710 A1 Apr. 1, 2004

Related U.S. Application Data

(62) Division of application No. 09/817,523, filed on Mar. 26, 2001, now abandoned.

(51) Int. Cl.$^7$ .............................. C01B 3/16; C01B 31/20
(52) U.S. Cl. ...................................... 423/437.2; 423/655
(58) Field of Search .................................. 423/655, 656, 423/437.2

(56) References Cited

U.S. PATENT DOCUMENTS

| | | |
|---|---|---|
| 3,077,385 A | 2/1963 | Robb |
| 4,172,808 A | 10/1979 | Boohm et al. |
| 4,190,439 A | 2/1980 | Gortsema |
| 4,851,206 A | 7/1989 | Boudart et al. |
| 5,230,729 A | 7/1993 | McCandlish et al. |
| 5,352,269 A | 10/1994 | McCandlish et al. |
| 5,372,797 A | 12/1994 | Dunmead et al. |
| 5,613,998 A | 3/1997 | Seegopaul et al. |
| 5,728,197 A | 3/1998 | Seegopaul et al. |
| 5,919,428 A | 7/1999 | Gao et al. |
| 6,623,720 B2 * | 9/2003 | Thompson et al. ......... 423/656 |

OTHER PUBLICATIONS

Saito, M., Anderson, R., J. Catal., 67(2), 296–302 (1981), no month.*
Shamsi, A., Lyons, D., American Chemical Society Division of Petroleum Chemistry, vol. 45(1), p. 132–134 (2000), no month.*
York, A.P.E., Claridge, J.B., Brungs, A.J., Tsang, S.C., Green, M.L.H., Chem Commun., 39–40 (1997), no month.*
Claridge, J.B., York, A.P.E., Brungs, A.J., Marquez–Alvarez, C., Sloan, J., Tsang, S.C., Green, M.L.H., Journal of Catalysis, 180, 85 (1998), no month.*
F. H. Ribeiro et al., *Preparation and Surface Composition of Tungsten Carbide Powders with High Specific Surface Area*, 1991 American Chemical Society, 805–812, no month.
*Refractory Hard Metals, Tungsten Carbides*, Macmillan, New York, 1953, no month.

* cited by examiner

*Primary Examiner*—Wayne A. Langel
(74) *Attorney, Agent, or Firm*—Wood, Herron & Evans, L.L.P.

(57) ABSTRACT

A molybdenum carbide compound is formed by reacting a molybdate with a mixture of hydrogen and carbon monoxide. By heating the molybdate powder from a temperature below 300° C. to maximum temperature 850° C., a controlled reaction can be conducted wherein molybdenum carbide is formed. A high surface area, nanograin, metastable molybdenum carbide can be formed when the reaction temperature is below 750° C. The metastable molybdenum carbide is particularly suitable for use as a catalyst for the methane dry reforming reaction and the water gas shift reaction.

4 Claims, No Drawings

METHOD OF USING MOLYBDENUM CARBIDE CATALYST

RELATED APPLICATION

This application is a divisional application of U.S. patent application Ser. No. 09/817,523, filed on Mar. 26, 2001, abandoned. The entire disclosure of this application is incorporated herein by reference.

BACKGROUND OF THE INVENTION

Synthesis gas is a mixture of hydrogen and carbon monoxide, which is formed from methane reforming and has a variety of different applications in organic reactions. This can be formed by combining steam and oxygen with methane at high temperatures. Another method of forming synthesis gas from methane is the methane dry reforming reaction. In this reaction, carbon dioxide is mixed with methane and the blend is subjected to high temperature i.e., 850° C. in the presence of a catalyst. This in turn forms hydrogen and carbon monoxide. The hydrogen from the reforming process is particularly suitable for use in fuel cell power systems.

The typical catalyst for use in the methane dry reforming reaction is a noble metal such as gold, platinum or the like. However, these catalysts tend to be relatively expensive. Molybdenum carbide is known as a catalyst for such reaction. However, this can be difficult to form. Further for use as a catalyst, high surface area is critical. Molybdenum carbide tends to form larger grains having reduced surface areas which in turn reduces its effectiveness as a catalyst. Thus, because of this problem and the high temperature and time required to form molybdenum carbide, it has not been used commercially as a catalyst for the methane dry reforming reaction.

Synthesis gas, mainly a mixture of $H_2$ and CO, may also contain $CO_2$, can be a cheap and easy to obtain fuel for fuel cells. However, CO in the synthesis gas can poison the expensive fuel cell catalyst. Therefore, it has to be removed from the synthesis gas before the gas is used for fuel cells. Low temperature water gas shift (WGS) reaction converts CO into $CO_2$, a harmless gas for the fuel cell catalyst. Additional benefit from the low temperature WGS is that it also generates $H_2$. It can be seen that WGS reaction could have a significant potential in the fuel cell technology.

SUMMARY OF THE INVENTION

The present invention is premised on the realization that a molybdenum carbide catalyst suitable for use in the methane dry reforming reaction as well as other reactions can be formed at relatively low temperatures and in relatively short periods of time. These reactions also include fuel processing as applicable in fuel cell uses.

More particularly the present invention is premised on the realization that molybdates such as ammonium molybdate can be directly formed into a high surface area molybdenum carbide by direct reaction with a mixture of hydrogen and carbon monoxide and methane. The molybdate is heated from a temperature below 300° C. to a temperature below 850° C. at a ramp rate of about 0.5–20° C./min in the presence of the hydrogen, carbon monoxide mixture and methane. This permits the molybdate to be reduced and then carburized directly to molybdenum carbide.

Depending on the reduction/carburization gases and the heating profile used, the product powders can have a wide range of specific surface area from just over 30 $m^2/g$ to almost 100 $m^2/g$. Typically, a 35 $m^2/g$ $Mo_2C$ powder can be generated with $CO/H_2$ mixture and a higher surface area powder with a combination of $CO/H_2$ and $CH_4/H_2$ mixtures. A two-step process was used to generate $Mo_2C$ powders with surface area over 60 $m^2/g$. First, the precursor was soaked in a $CO/H_2$ mixture at a low temperature (300°–400° C.). Then, the intermediate was heated-up slowly in the $CO/H_2$ mixture (up to 500° C.) and a $CH_4/H_2$ mixture (above 500° C.) to the final soak temperature (600°–650° C.). It is believed that $Mo_2C$ starts to nucleate during the low temperature soak and the intermediate (XRD amorphous) from the soak develop slowly into $Mo_2C$ during the ramp and the high temperature soak. It is this low temperature nucleation give the finished powder very high surface area. CO was selected as the low temperature carburization gas because it is more active than $CH_4$ at low temperatures, while $CH_4$ is a better choice at higher temperatures.

The high surface $Mo_2C$ is useful as a catalyst in the methane dry reforming reaction.

The high surface area $Mo_2C$ powder of the present invention can have higher catalysis activity for the WGS reaction than the commercial catalyst, which is widely used currently. Generally, the higher the surface area of a $Mo_2C$ powder, the higher the catalysis activity the powder can deliver.

DETAILED DESCRIPTION

According to the present invention, a molybdenum carbide powder is formed from a molybdate or molybdenum oxide by reacting it under 750° C. with a mixture of a reducing and carburizing gases, which are specifically hydrogen and carbon monoxide and methane. The formed carbide has a structure of $Mo_2C_y$, wherein y represents 0.95 to 1.05.

The starting molybdate can be any molybdate wherein the counter ion is not a metal. Generally, the counter ion will be an organic compound or ammonium which is preferred due to its availability. Other molybdenum compounds such as molybdenum oxides can also be used.

The reaction gas is a blend of hydrogen and carbon monoxide or methane at a ratio between 3:1 to 1:1 and preferably at 1:1 ratio (by volume). Other carburizing gases such as ethylene can also be used.

The reaction can be conducted in any suitable furnace which permits control of the gaseous atmosphere and temperature. A rotary kiln is particularly suitable due to its ability to ensure adequate mixing of the solid and gaseous reactants. The ammonium molybdate or molybdenum oxide powder is simply loaded into a quartz liner and placed into the rotary kiln.

The system is purged with nitrogen first and then a hydrogen, carbon monoxide mixture in the ratio stated above (preferably 30–50% CO) is introduced. The temperature can be quickly raised to 300° C.–400° C. and held for 1–5 hours and thereafter the temperature ramp rate should not exceed 20° C./min and preferably is 0.5–20° C./min. The reaction temperature and the furnace temperature ramp rate are critical for achieving maximum surface area. The molybdate starts decomposition at about 300° C. It decomposes into oxides, which at some stage can be amorphous. The reduction and carburization of the resulting oxide occurs at the same time when the temperature goes above 400° C. A second 3- to 5-hour soak (in $H/CH_4$ with the above stated ratio preferably 20–60% $CH_4$) at a temperature between 550° to 850° C. provides enough time to expedite the formation of molybdenum carbide.

The maximum temperature should not exceed 850° C. and most preferably be less than 700° C. At 700° C., the reaction can be completed in 2 to 4 hours. The reaction time can be shortened by increasing the reaction temperature at the expense of increasing grain size and reducing surface area.

During the reaction, the feeding gas composition can be changed if desired in order to adjust the total carbon content of the powder. Subsequently, the reactor is cooled down with flowing hydrogen, carbon monoxide mixture, hydrogen alone, or nitrogen. Because of the high surface area, the powder should be passivated with diluted oxygen or air after the powder cools down to room temperature.

The molybdenum carbide formed in this manner is a metastable $Mo_2C_y$. X-ray diffraction on the carbide powder shows some missing peaks in the diffraction pattern. At this stage, the powder samples exhibit specific surface areas of over 35 $m^2/g$.

High surface area $Mo_2C$ has also been used as a catalyst for a low temperature water gas shift (WGS) reaction, from which $H_2$ and $CO_2$ are generated from CO and $H_2O$ (vapor). As we know, synthesis gas (mainly a mixture of $H_2$ and CO, may also contain $CO_2$) can be a cheap and easy to obtain (from cracking of many organic compounds) fuel for fuel cells. However, CO in the synthesis gas can poison the expensive fuel cell catalyst. Therefore, it has to be removed from the synthesis gas before the gas is used for fuel cells. Low temperature WGS reaction converts CO into $CO_2$, a harmless gas for the fuel cell catalyst. Additional benefit from the low temperature WGS is that it also generates $H_2$. It can be seen that WGS reaction can have a significant potential in the fuel cell technology. Our preliminary test result indicates that a high surface area $Mo_2C$ powder can have higher catalysis activity for WGS reaction than the commercial Cu—Zn catalyst, which is widely used currently. Generally, the higher the surface area of a $Mo_2C$ powder, the higher the catalysis activity the powder can deliver.

The invention will be further appreciated in light of the following detailed examples.

EXAMPLE 1

1.0 lb of ammonium molybdate powder was loaded in a rotary kiln and heated to 590° C. and then 760° C. at a ramp rate of about 10° C./min in a gaseous mixture of $H_2$ and CO at 1:1 volume ratio. The soak time is 5 hours at 590° C. and 3 hours at 760° C. After the furnace cooled down to room temperature, the powder was passivated with a dilute air for about 1 hour. XRD on the product powder shows $Mo_2C$. The BET specific surface area of the powder was 18.5 $m^2/g$. Carbon analysis on the powder showed 5.84% combined carbon and 1.72% free carbon.

EXAMPLE 2

1.0 lb of ammonium molybdate powder was loaded in a rotary kiln and heated to 590° C. and then 700° C. at a ramp rate of about 10° C./min in a gaseous mixture of $H_2$ and CO at 1:1 volume ratio. The soak time is 5 hours at 590° C. and 3 hours at 700° C. After the furnace cooled down to room temperature, the powder was passivated with a dilute air for about 1 hour. XRD on the product powder shows defect $Mo_2C$ with some missing peaks in the XRD pattern. The BET specific surface area of the powder was 37.7 $m^2/g$. Carbon analysis on the powder showed 6.07% combined carbon and 1.62% free carbon.

EXAMPLE 3

1.0 lb of ammonium molybdate powder was loaded in a rotary kiln and heated to 700° C. at a ramp rate of about 10° C./min in a gaseous mixture of $H_2$ and CO at 1:1 volume ratio. The soak time is 5 hours at 700° C. After the furnace cooled down to room temperature, the powder was passivated with a dilute air for about 1 hour. XRD on the product powder shows defect $Mo_2C$ with some missing peaks in the XRD pattern. The BET specific surface area of the powder was 35.7 $m^2/g$. Carbon analysis on the powder showed 5.99% combined carbon and 2.15% free carbon.

EXAMPLE 4

1.6 lb of ammonium molybdate powder was loaded in a production tube furnace and heated to 1080° F. (582° C.) and then 1290° F. (699° C.) at a ramp rate of about 8° C./min in a gaseous mixture of $H_2$ and CO at 3:1 volume ratio. The soak time is 10 hours at 1080° F. and 3 hours at 1290° F. After 3 hours carburization at 1290° F., additional 16% $CO_2$ was introduced for free carbon removal. The decarburization was performed for another 3 hours. After the furnace cooled down in $N_2$ to room temperature, the powder was passivated with a dilute air. XRD on the product powder showed $Mo_2C$ and a XRD peak broadening technique gave a $Mo_2C$ grain size of 26 nm. The BET specific surface area of the powder was 39 $m^2/g$. Carbon analysis on the powder showed 5.53% combined carbon and <0.04% free carbon.

EXAMPLE 5

A methane dry reforming catalyst test was done on the metastable $Mo_2C$ powder synthesized as shown in example 2. The test was performed in a small tube furnace at 850° C. Two quartz wool plugs were used to keep 5 g $Mo_2C$ powder layer in between and permit the reacting gases passing through. Mass flow meters were used to control the gas flow and a 3-channel ($CH_4/CO/CO_2$) IR analyzer was used to monitor the inlet and outlet gas compositions. The test showed 47% CO yield initially, which is very close to the equilibrium 49% CO yield. This high CO yield was kept for over 48 hours. Then, the yield dropped to and stabilized at about 25% for another 24 hours. The test was interrupted after 72 hours. Catalytic activity was still obvious, even after 72 hours of reaction.

Other than the surface area, the surface status of a $Mo_2C$ powder directly affects its catalysis activity. It is known that the free carbon deposit on the powder surface can block some active sites and lower the catalysis activity of the powder. The surface oxygen also affects the catalysis activity. As indicated, due to the highly active nature of a high surface area $Mo_2C$ powder, a passivation treatment is generally necessary after the powder synthesis and before the exposure of the powder to air. During the passivation treatment, a well-controlled oxidation (0.01 to 0.1% $O_2$ in $N_2$) is applied to the powder so that a very thin and dense layer of oxide forms on the surface of the powder preventing the powder from further oxidation. An XPS analysis on a passivated $Mo_2C$ powder has confirmed the existence of Molybdenum oxide on the surface of the powder.

This oxide layer has to be removed before any catalysis test. A treatment was done on the $Mo_2C$ powder right before the WGS catalysis test. The treatment comprises of 1 - or 2-hour annealing of the powder at 300°–600° C. in flowing $H_2$ or a $CH_4/H_2$ mixture. This treatment significantly increases the catalysis activity.

Even though a $Mo_2C$ powder is quite stable in the WGS feeding gas stream at temperatures below 500° C., it may still be a partially oxidized after a long term exposure to the feeding gas. Therefore, recovery capability is an important property of this catalyst. Test results indicate that a high surface area $Mo_2C$ can be recovered in-situ with a re-carburization treatment. The re-carburization treated powder can have a high WGS catalysis activity again.

More details of the work is illustrated in the following examples.

EXAMPLE 6

5 g ammonium molybdate powder was loaded in a tube furnace. In the gas stream of 50%CO with $H_2$, the powder was heated-up 350° C. and soaked at 350° C. for 2 hours. The powder was then ramped at 1° C./min in 50% CO with $H_2$ to 500° C. and then in 40% $CH_4$ with $H_2$ to 620° C. After reaching 620° C., the powder was soaked in 40% $CH_4$ with $H_2$ at 620° C. for 4 hours. The product powder was $Mo_2C$ as confirmed by XRD and the BET surface area of the powder was 90 $m^2/g$. The powder contains no free carbon (<0.04%).

EXAMPLE 7

5 g of a $Mo_2C$ powder with a specific surface area 54 $m^2/g$ was used as a catalyst for the WGS test. The feeding gas had 49.0% $H_2$, 6.0% CO, 15.0% $CO_2$ and 30.0% $H_2O$ (vapor) with the total flow rate about 1540 cc/min, or 1330 $min^{-1}$ space velocity (assuming $Mo_2C$ has bulk density 4.5 g/cc). IR was used for the inlet and outlet gas composition analysis and the magnitude of CO loss or $CO_2$ gain after the WGS reaction was used to measure the WGS catalysis activity of the catalyst. At 250° C., the maximum CO loss was 0.30 $\mu$mol/g.sec and the corresponding $CO_2$ gain was 0.75 $\mu$mol/g.sec. As a comparison, a commercial Cu—Zn catalyst gave 6.11 $\mu$mol/g.sec CO loss and 5.67 $\mu$mol/g.sec corresponding $CO_2$ gain.

EXAMPLE 8

5 g of the same $Mo_2C$ powder as what in the Example 7 was used for the WGS test. Testing conditions were the same as that in the Example 7. However, a 2-hour annealing at 550° C. in flowing $H_2$ was done to the powder right before the WGS test. At 250° C., the powder gave 6.11 $\mu$mol/g.sec. Maximum CO loss and 5.67 mol/g.sec. corresponding $CO_2$ gain.

EXAMPLE 9

5 g of the same $Mo_2C$ powder as that in the Example 7 was used for the WGS test. Testing conditions were the same as that in the Example 7. However, a 2-hour annealing at 550° C. in flowing $H_2$ and 10% $CH_4$ gas mixture was done to the powder right before the WGS test. At 250° C., the powder gave 5.97 $\mu$mol/g.sec. maximum CO and 5.70 mol/g.sec corresponding $CO_2$ gain.

EXAMPLE 10

5 g of a $Mo_2C$ powder with a specific surface area 77 $m^2/g$ was used for the WGS test. Testing conditions were the same as that in the Example 7. A 2-hour annealing at 550° C. in flowing $H_2$ and 10% $CH_4$ gas mixture was done to the powder right before the WGS test. At 250° C., the powder gave 9.77 $\mu$mol/g.sec. maximum CO loss and 7.89 $\mu$mol/g.sec. corresponding $CO_2$ gain.

For easier comparison, the 250° C. WGS test results from the Examples 7–10 are summarized in the following table.

| Catalyst | Cu—ZnO | $Mo_2C$ | $Mo_2C$ | $Mo_2C$ | $Mo_2C$ |
|---|---|---|---|---|---|
| Surface Area ($m^2/g$) | — | 54 | 54 | 54 | 77 |
| Pre-WGS Treatment | — | — | 550° C. in $H_2$ | 550° C. in 10% $CH_4/H_2$ | 550° C. in 10% $CH_4/H_2$ |
| CO gain ($\mu$mol/g · sec) | -6.11 | -0.30 | -4.21 | -5.97 | -9.77 |
| $CO_2$ gain ($\mu$mol/g · sec) | 5.67 | 0.75 | 3.33 | 5.70 | 7.89 |

It can be seen that without any pre-WGS treatment, the 54 $m^2/g$ $Mo_2C$ powder has little WGS catalysis activity. With some in-situ treatment (better with $CH_4/H_2$ mixture) right before the WGS testing, the 54 $m^2/g$ $Mo^2C$ powder can have similar WGS catalysis activity as the commercial Cu—Zn catalyst. The 77 $m^2/g$ $Mo_2C$ powder has much higher WGS catalysis activity than the commercial catalyst.

EXAMPLE 11

3 g of a partially oxidized $Mo_2C$ powder was used for a recovering test. The powder was obtained by exposing the same $Mo_2C$ powder as that in the Example 6 to a flowing water vapor stream at 600° C. for 1 hour. XRD confirmed the existence of $MoO_2$ in addition to $Mo_2C$ in the powder. The recovering test started with a 1-hour WGS test at 250° C. followed by a 30-hour re-carburization treatment with a $CH_4/H_2$ mixture at 500° C. Then another 1-hour WGS test was done at 250° C. on the re-carburization treated powder. The WGS testing conditions were the same as that in the EXAMPLE 2. Before the re-carburization treatment, the powder gave 0.12 $\mu$mol/g.sec. maximum CO loss and 0.61 $\mu$mol/g.sec. corresponding $CO_2$ gain, while after the treatment, the powder gave 8.24 $\mu$mol/g.sec. maximum CO loss and 3.29 $\mu$mol/g.sec. corresponding $CO_2$ gain.

Thus as shown, the high surface area molybdenum carbide catalyst of the present invention is useful both in the methane dry reforming reaction as well as in the water gas shift reaction. The low temperature i.e., 200° to 400° C. water gas shift reaction is very useful for fuel cell applications in which carbon monoxide reacts with water vapor to generate hydrogen, a clean efficient energy source for fuel cells and carbon dioxide, a harmless gas for fuel cells. The molybdenum carbide catalyst of the present invention is excellent in this low temperature application. This can be activated by an in-situ heat treatment immediately before use as a catalyst in the fuel cell by annealing of the catalyst in hydrogen, hydrogen carbon monoxide or hydrogen methane mixtures at 300° to 600° C. for 0.5 to 5 hours. Further, partially oxidized high surface area molybdenum carbide catalyst can be reactivated or recovered by similar in-situ re-carburization treatment. Again by annealing in hydrogen or hydrogen carbon monoxide or hydrogen methane mixtures at temperatures of 400° to 700° C. for 0.5 to 5 hours. Thus, the present invention is extremely useful in fuel cell application.

This has been a description of the present invention along with the preferred method of practicing the present invention. However, the method itself should only be defined by the appended claims wherein

We claim:

1. The method of conducting a water gas shift reaction comprising contacting a gas comprising a mixture of hydrogen, carbon monoxide and water vapor at a temperature of about 200° to 550° C. with a catalyst said catalyst comprising molybdenum carbide having a surface area of at least 77 m$^2$/g.

2. The method claimed in claim 1 wherein said gas comprises a mixture of hydrogen, carbon monoxide, carbon dioxide and water vapor.

3. The method claimed in claim 1 wherein said catalyst is subjected to an anneal in hydrogen at 55° C. for at least 2 hours.

4. The method claimed in claim 1 wherein said catalyst is formed by soaking a molybdenum compound selected from the group consisting of molybdates and molybdenum oxide in HCO gas at 300°–400° C. for 1 to 5 hours and subsequently soaking said molybdenum compound in H/CH$_4$ gas for 3 to 5 hours at a temperature of 550° to 800° C.

* * * * *